No. 873,940. PATENTED DEC. 17, 1907.
F. HOFFMAN.
ELECTRICAL CONNECTION FOR HOSE COUPLINGS.
APPLICATION FILED JUNE 30, 1906.

Witnesses
Oliver W. Holmes
E. B. McBeath

Inventor
F. Hoffman,
By Meara & Brock
Attorneys

UNITED STATES PATENT OFFICE.

FREDRICK HOFFMAN, OF CINCINNATI, OHIO.

ELECTRICAL CONNECTION FOR HOSE-COUPLINGS.

No. 873,940.   Specification of Letters Patent.   Patented Dec. 17, 1907.

Application filed June 30, 1906. Serial No. 324,172.

*To all whom it may concern:*

Be it known that I, FREDRICK HOFFMAN, a citizen of the United States, residing at Cincinnati, in the county of Hamilton and State of Ohio, have invented a new and useful Improvement in Electrical Connections for Hose-Couplings, of which the following is a specification.

This invention relates to a telephone system adapted to be used by fire engine companies for use in fires, and the object of the invention is the extending of the wires through the different hose sections and coupler construction by means of which the wires forming the telephone circuit will be connected together whenever two or more sections of hose are coupled.

I am aware of the fact that electrical wires have been heretofore run through hose sections, but they have been so placed that in order to operatively connect up the wires of one section with those of another, it was necessary that the coupling members should be very tightly locked, and no allowance was made for wear on the couplers, nor to the fact that very often in the hurry of getting the hose line in position, one coupling member will be only partially threaded over or into the co-acting member, and in such cases, there has, of course, been a break in the circuit.

Figure 1:
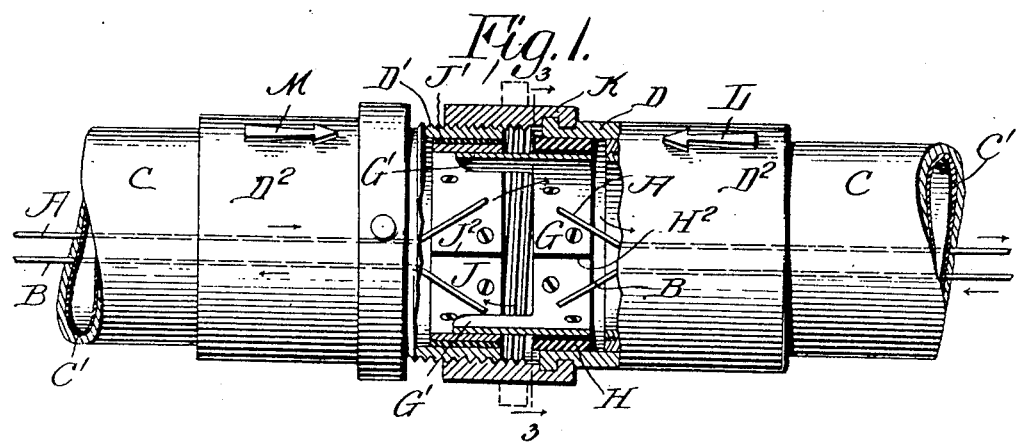
Figure 2:
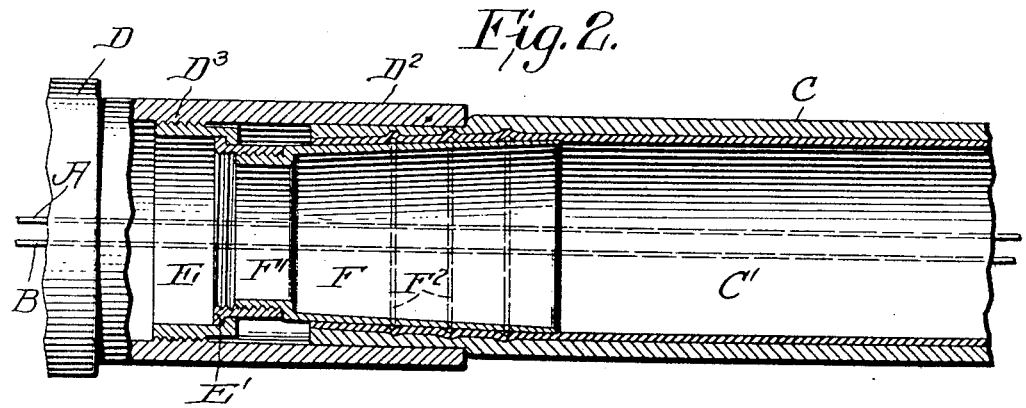
Figure 3:
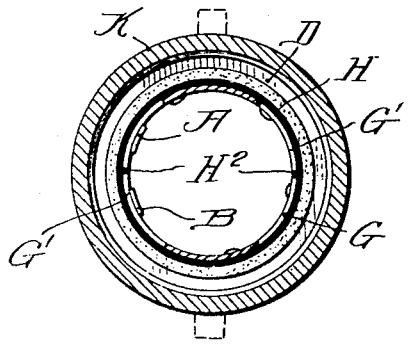
Figure 4:
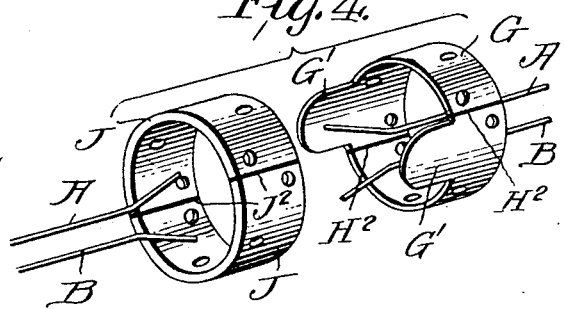

My invention consists of the novel features of construction and combination of parts hereinafter described, pointed out in the claims, and shown in the accompanying drawings, in which, Figure 1, is a side elevation of a portion of two hose sections, pieces of the coupling members being broken out and shown in sections. Fig. 2, is an enlarged longitudinal sectional view, taken through a coupling sleeve and end section of the hose. Fig. 3, is a transverse section on the line 3—3 of Fig. 1. Fig. 4, are detail perspective views of contact rings carried by the coupler members.

In the drawings 1 and 2 represent the connecting wires which complete the circuit between the telephone, the phone wiring being, of course, the usual or any desired arrangement. The wires A and B are placed in the hose sections C and are, of course, suitably insulated and lie between the inner and outer layer composing the hose. I provide also co-acting coupler members D and $D^1$ each of which carry suitable sleeves $D^2$. In Fig. 3, I have shown the manner in which the hose section C is secured in said sleeves. Each sleeve is interiorly threaded as shown at $D^3$ and a flanged collar of ring E is threaded into the sleeve and the second ring $E^1$, also interiorly threaded and flanged is slipped partially through the ring E, bringing the flanges or the two rings together. The sleeve F having a reduced end portion $F^1$ exteriorly threaded has the portion $F^1$ threaded into the ring $E^1$, and the hose C is fitted over the sleeve F which sleeve is also provided with a plurality of ribs $F^2$ which serves to hold the hose C from slipping upon the sleeve F. When the parts are assembled in position, the hose C is gripped between the sleeves $D^2$ and F.

The wires A and B suitably insulated are embedded within the hose C, being carried between the body portion of the hose proper and the inner lining $C^1$. Within the coupler member D is secured a ring G which ring is insulated by the ring of insulating material H from the middle part of the coupler member and the ring G is split transversely at opposite points forming the ring into two semi-cylindrical sections which are insulated from each other by any suitable insulating material $H^2$. Each section of the ring G is provided with forwardly projecting lips $G^1$. The wires A and B running through the hose C connected to the coupling member D are secured respectively to the sections of the ring G, by soldering or in any other convenient manner. The coupling member $D^1$ carries a ring J also split to form two sections and this ring is insulated from the coupling member by a ring of insulation $J^1$ and the two sections of the ring J are insulated from each other by insulating material $J^2$. Wires A and B carried by the section of the hose to which the coupling member $D^1$ is connected are also secured to the sections of the ring J. Within the coupling members D and $D^1$ coupled together, the lips $G^1$ of the ring G will project into and bear against the inner faces of the sections forming the ring J. It will be obvious therefrom that it is only necessary to thread the couplers together sufficiently to bring the lips $G^1$ into contact with the sections of the ring J to complete the electrical connection between the wires carried by the two connecting hose lengths.

The operation of the device, it is thought, will be clear from the above description of the construction of the parts and the manner in which they are assembled together when in working order by means of the coupling member, herein described, a continuous electrical connection can be maintained between the telephone apparatus mounted upon the truck or engine, and the telephone apparatus carried by the hose nozzle.

The usual tire collar K is employed to draw the couplers D and D¹ together. Raised arrows L and M are formed on the coupler members and when brought into the position shown in Fig. 2 indicate to the firemen that an electrical connection has been established between the hose sections.

What I claim is:—

A device of the kind described, comprising coupling members, hose sections connected thereto, electric wires carried by said sections, a flat sectional ring carried by and within one of said coupling members, the wires of the adjacent hose sections being connected respectively to the sections of the ring, a flat sectional ring carried within the other coupling member, the wires of the connected hose section being connected to the sections of said ring, and a lip carried by each section of the last mentioned ring adapted to project within the first mentioned ring and slide upon a section thereof when the coupling members are partially coupled.

FREDRICK HOFFMAN.

Witnesses:
 THOMAS O'MEARA,
 LOUIS J. HOPPE.